United States Patent Office 3,115,440
Patented Dec. 24, 1963

3,115,440
3-ENOLETHERS OF FREE AND ESTERIFIED 17α-ETHYNYL-19-NORTESTOSTERONE
Alberto Ercoli, Via Circo 12, Milan, Italy
No Drawing. Filed May 4, 1960, Ser. No. 26,717
Claims priority, application Germany May 4, 1959
8 Claims. (Cl. 167—74)

This invention is concerned with a series of $\Delta^{3,5}$ steroids related to 19-nortestosterone and is more particularly concerned with the new 3-enol ethers of 19-nortestosterone, 17α-derivatives thereof and acyl esters of 19-nortestosterone and said derivatives, represented by the following general formula:

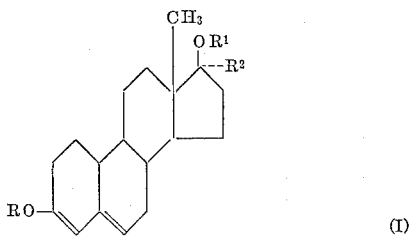

wherein R is a hydrocarbon radical containing from one to twelve carbon atoms inclusive, $R^1$ represents hydrogen or the acyl residue of an organic carboxylic acid, particularly a lower alkanoic acid such as acetic acid, and $R^2$ represents hydrogen or a lower alkyl or lower alkynyl radical. The lower alkyl radical may be methyl, ethyl, propyl, normal and iso, and the lower alkynyl radical is of the structure $C\equiv CR^3$ in wrich $R^3$ represents hydrogen or an alkyl residue containing from one to three carbon atoms.

It is an object of the invention to provide new steroid compounds having physiological activity. It is another object of the invention to provide pharmaceutical compositions containing the new compounds, and a further object of the invention is to conduct steroid therapy employing these compositions.

The new enol ethers of this invention possess an improved biological activity over the corresponding $\Delta^4$-3-ketones. In particular, the 3-enol ethers of Formula I above where $R^2$ is hydrogen are useful as anabolic agents since their anabolizing activity is accompanied by few androgenic-like effects. They show a more favorable ratio of anabolic to androgenic activity when compared to 19-nortestosterone and its esters, as well as 3-enol acylates thereof and in addition they are substantially devoid of estrogenic properties.

The 3-enol ethers of Formula I above where $R^2$ is an alkynyl radical possess a potentiated progestational activity. Of particular value are the alkyl and cycloalkyl enol ethers of 17α-ethynyl 19-nortestosterone, specially those containing from four to six carbon atoms, which compounds exhibit by oral route a superior progestational effect and are practically devoid of masculinizing properties.

The compounds according to the invention are suitable for therapeutic purposes and can be formulated for administration in any suitable manner but are preferably administered in association with a nontoxic pharmaceutical carrier which may be liquid or solid, depending on the desired route of administration. Preferably, when the compounds are administered by oral route, they are given as an oily solution contained in a capsule, e.g., of gelatin or other material, in dosage unit form comprising the active compound in an amount of from .001 mg. to about 30 mg.

The method of this invention comprises orally administering the new compounds to humans, in an amount sufficient to produce therapeutic effects, in admixture with a nontoxic pharmaceutical carrier as exemplified above. The daily dosage of 3-enol ethers will be in an amount of from about 0.001 mg. to about 30 mg. and preferably from about 0.01 mg. to about 10 mg. The administration is by the oral route, in equal doses, one to three times daily.

The 3-enol ethers of 19-nortestosterone and 17α-alkyl or alkynyl derivatives thereof can be prepared by any convenient method. Thus, the lower alkyl enol ethers can readily be obtained by the action of a lower alkyl orthoformate on the corresponding $\Delta^4$-3-ketone, preferably carrying out the reaction at room temperature in the presence of a small amount of an acid catalyst.

The higher alkyl enol ethers, as well as cyclo- and aralkyl enol ethers, can be readily obtained by reacting the preformed enol ethyl or methyl ether with an excess of the appropriate aliphatic, cyclo- or arylaliphatic alcohol, in solution in an organic solvent and in the presence of catalytic amounts of an acid catalyst, as described in my copending application Ser. No. 26,711, filed of even date herewith and now Pat. No. 3,019,241 entitled, "Process for the Preparation of Enol Ethers of $\Delta^4$-3-Keto Steroids." Suitable catalysts are the aromatic sulphonic acids such as toluene, benzene and naphthalene sulphonic acids as well as Lewis acids. Salts of organic bases with mineral acids such as, for example, pyridine hydrochloride can also be employed as catalyst.

The organic solvent is substantially nonpolar. Benzene and its homologues, cyclohexane, isooctane, tetrahydrofuran or dioxan can be advantageously employed. Halogenated organic solvents such as ethylene bromide, chloroform or tetrachlorethane, may be also employed, alone or in admixture with one of the above solvents.

The reaction mixture constituted by the preformed enol ethyl ether of 19-nortestosterone or 17α-alkyl or alkynyl derivative thereof suspended or dissolved in one of the above solvents, the desired alcohol and the acid catalyst, is heated to boiling with an ascending or descending condenser. In the latter case, some liquid is distilled off at ordinary pressure so that the ethanol which forms during the exchange reaction can be removed. The distillation period depends, of course, on the volume of the solvent employed and the amount of the enol ethyl ether to be reacted.

The remaining solution is then made slightly alkaline by addition of a weak organic base, such as pyridine, and is evaporated to small bulk or dryness in vacuo. The crystallization of the resulting 3-enol higher ether, contained in the residue, can be suitably facilitated by adding ether, methyl or ethyl alcohol, or hexane or another solvent of this type.

In order that the invention may be understood, the following examples are given by way of illustration only:

*Example 1*

To a solution of 500 mg. of 19-nortestosterone propionate in 3 cc. of tetrahydrofuran are added 0.5 cc. of ethyl orthoformate, 0.4 cc. of dry ethanol, and 8 mg. of p- toluenesulfonic acid. The reaction mixture is allowed to stand at room temperature (about 20° C.) for fifty minutes, then a few drops of pyridine are added and the solution is concentrated in vacuo. The residue is taken up with methanol, filtered, dried and recrystallized from a mixture of methylene chloride-methanol, containing a few drops of pyridine, to yield the 3-enol ethyl ether of 19-nortestosterone propionate, melting at 116–118° C.; $[\alpha]_D = -155°$ (dioxan). The above compound by careful hydrolysis in an alkaline medium yields the corresponding 3-enol ethyl ether of 19-nortestosterone as the free alcohol melting at 97–99° C.

Example 2

1 g. of 3-enol ethyl ether of 19-nortestosterone propionate is dissolved in about 80 cc. of anhydrous benzene and reacted with 15 mg. of p-toluenesulfonic acid and 6 cc. of cyclohexanol. The reaction mixture is heated and the major proportion of the liquid is distilled off so that the ethanol which evolved during the exchange reaction is evaporated off completely. To the residual solution a few drops of pyridine are added and the liquid is evaporated in vacuo.

The residue recrystallized from methanol containing a little pyridine consists of 3-enol cyclohexyl ether of 19-nortestosterone propionate, melting at 124–126° C.; $[\alpha]_D = -135°$ (dioxan).

From the above compound by careful hydrolysis in an alkaline medium the corresponding 3-enol cyclohexyl ether of 19-nortestosterone free alcohol is readily obtained at melting point 134–137° C.

Example 3

To a mixture of 600 cc. of anhydrous benzene and 20 cc. of benzyl alcohol, 60 mg. of sulphosalicylic acid are added. A portion of the solvent is distilled off in order to remove azeotropically any possible trace of moisture.

To the remaining mixture, 3.4 g. of 3-enol ethyl ether of 19-nortestosterone propionate are added and distillation is continued for approximately 30 minutes. After neutralization of the residual solution with pyridine and evaporation of the solvent, 3-enol benzyl ether of 19-nortestosterone propionate is obtained, M.P. 174–176° C.; $[\alpha]_D = -132°$ (c.=0.25% in dioxan).

Similarly, the 3-enol benzyl ethers of the following esters of 19-nortestosterone are obtained; formate, acetate, trimethylacetate, oenanthate, phenylpropionate and cyclopentylpropionate.

Example 4

Following the procedure of Example 1, 3-enol ethyl ether of 19-nortestosterone acetate is obtained at melting point 131–134° C.; $[\alpha]_D = -167°$ (dioxan).

To a mixture of 300 cc. of dioxan and 12 cc. of n-amyl alcohol, 3 g. of 3-enol ethyl ether of 19-nortestosterone acetate and 50 mg. of p-toluenesulfonic acid are added and the resulting mixture is processed as in Example 2 to give 3-enol n-amyl ether of 19-nortestosterone acetate, M.P. 75.5–78° C.; $[\alpha]_D = -140°$ (dioxan).

Similarly, 3-enol n-butyl ether of 19-nortestosterone acetate is obtained, melting at 128–131° C.; $[\alpha]_D = -167°$ (dioxan). Analogously, 3-enol heptyl ether of 19-nortestosterone acetate is prepared, M.P. 64.5–65.5° C.; $[\alpha]_D = -135.5$ (dioxan).

Example 5

0.9 g. of 19-nortestosterone phenylpropionate in dioxan solution is reacted at room temperature (about 25° C.) with 2 cc. of propyl orthoformate and 0.1 g. of pyridine hydrochloride to give 3-enol propyl ether of 19-nortestosterone phenylpropionate. The compound (0.3 g.) reacted in benzene solution with 4 cc. of cyclopentanol in the presence of 20 mg. of p-toluene sulfonic acid produces 3-enol cyclopentyl ether of 19-nortestosterone phenylpropionate.

Example 6

A solution of 1.2 g. of 3-enol methyl ether of 19-nortestosterone trimethylacetate in benzene solution is treated with 6 cc. of furfuryl alcohol and 20 mg. of p-toluenesulfonic acid to give 3-enol furfuryl ether of 19-nortestosterone trimethylacetate.

Example 7

Following the procedure of Example 2, other representative 19-nortestosterone 3-enol ethers are prepared, including 3-enol (2-methyl)pentyl ether of 19-nortestosterone as the free alcohol, 3-enol sec-butyl ether of 19-nortestosterone propionate and 3-enol cyclopentyl ether of 19-nortestosterone formate.

Example 8

800 mg. of 17α-methyl 19-nortestosterone dissolved in 3 cc. of tetrahydrofuran are treated with 0.8 cc. of ethyl orthoformate, 0.5 cc. of anhydrous ethanol and 8 mg. of p-toluenesulfonic acid, as in Example 1, to give 680 mg. of 3-ethyl enol ether of 17α-methyl 19-nortestosterone melting at 125–128° C.; $[\alpha]_D = -165°$ (dioxan).

In the same mannner 3-ethyl enol ether of 17α-ethynyl 19-nortestosterone is obtained, melting at 172–174° C.; $[\alpha]_D = -222°$ (dioxan).

Similarly, 17α-ethynyl 19-nortestosterone acetate is reacted with methyl orthoformate and methyl alcohol to give 3-methyl enol ether of 17α-ethynyl 19-nortestosterone acetate at melting point 183–185° C.; $[\alpha]_D = -212°$ (dioxan).

Example 9

A mixture consisting of 1 g. of 17α-ethynyl 19-nortestosterone acetate, 1 cc. of ethyl orthoformate, 2 cc. of anhydrous ethanol and 15 mg. of sulfosalicylic acid is allowed to stand for 40 minutes at room temperature, with continuous stirring to effect complete dissolution. Then the solution is poured into a boiling mixture consisting of 400 cc. of benzene, 3 cc. of n-amyl alcohol and 20 mg. of sulfosalicylic acid and the resulting mixture refluxed for 30 minutes. After cooling, a few drops of pyridine are added and the solvent eliminated under vacuum, thus obtaining 0.850 g. of 3-amyl enol ether of 17α-ethynyl 19-nortestosterone acetate melting at 108–110° C.; $[\alpha]_D = -194°$ (dioxan).

In the same manner, 3-hexyl and heptyl enol ethers of 17α-ethynyl 19-nortestosterone acetate are obtained.

Example 10

700 mg. of 3-ethyl enol ether of 17α-ethynyl 19-nortestosterone acetate are treated in benzene solution with 1.8 cc. of cyclopentyl alcohol and 25 mg. of p-toluenesulfonic acid, as in Example 2, to give 3-cyclopentyl enol ether of 17α-ethynyl 19-nortestosterone acetate melting at 180–183° C.; $[\alpha]_D = -212° \pm 1$ (dioxan).

Analogously, cyclopentyl enol ether of 17α-ethyl 19-nortestosterone acetate is obtained.

Example 11

In a manner corresponding to that of the previous examples, the following new enol ethers are prepared: butyl enol ether of 17α-methyl 19-nortestosterone; hexyl enol ether of 17α-methyl 19-nortestosterone acetate; cyclohexyl enol ether of 17α-methyl 19-nortestosterone; benzyl enol ether of 17α-methyl 19-nortestosterone acetate; (2-methyl)pentyl ether of 17α ethynyl 19-nortestosterone; cyclohexyl enol ether of 17α-ethynyl 19-nortestosterone acetate and the like.

I claim:
1. A compound of the formula

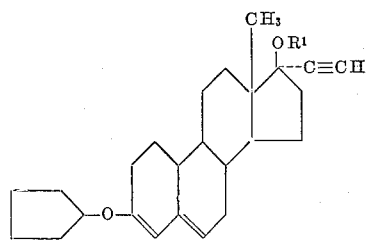

wherein $R^1$ is selected from the group consisting of hydrogen and lower alkanoyl.

2. 3-cyclopentyl enol ether of 17α-ethynyl 19-nortestosterone acetate.

3. A pharmaceutical composition in dosage unit form comprising from .001 mg. to 30 mg. of a steroid having the formula

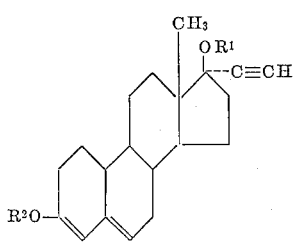

wherein $R^1$ is selected from the group consisting of hydrogen and lower alkanoyl and $R^2$ a hydrocarbon radical containing from one to twelve carbon atoms and a nontoxic pharmaceutical carrier.

4. A pharmaceutical composition in dosage unit form comprising from .001 mg. to 30 mg. of the cyclopentyl enolether of 17α-ethynyl-19-nortestosterone acetate and a nontoxic pharmaceutical carrier.

5. A method of carrying out steroid therapy comprising orally administering daily to a human patient from .001 mg. to 30 mgs. of a steroid having the formula

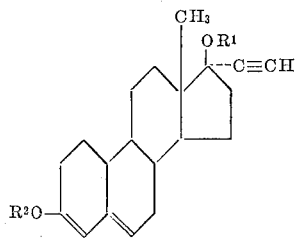

wherein $R^1$ is selected from the group consisting of hydrogen and lower alkanoyl and $R^2$ a hydrocarbon radical containing from 1 to 12 carbon atoms.

6. A method as claimed in claim 5 in which there is administered from 0.01 mg. to 10 mg. of said steroid.

7. A method of carrying out steroid therapy comprising orally administering daily to a human patient from .001 mg. to 30 mg. of the cyclopentyl enolether of 17α-ethynyl-19-nortestosterone acetate.

8. A method as claimed in claim 7 in which there is administered from 0.01 mg. to 10 mg. of said cyclopentyl enolether of 17α-ethynyl-19-nortestosterone acetate.

References Cited in the file of this patent

UNITED STATES PATENTS

| | | |
|---|---|---|
| 2,363,338 | Koster | Nov. 21, 1944 |
| 2,929,763 | Wettstein et al. | Mar. 22, 1960 |
| 2,964,537 | Engelfried et al. | Dec. 13, 1960 |
| 3,067,212 | Bowers et al. | Dec. 4, 1962 |

OTHER REFERENCES

Dorfman et al.: Androgens (1956), John Wiley and Sons Inc., New York, pages 383–385.